United States Patent [19]
Keating et al.

[11] Patent Number: 5,564,455
[45] Date of Patent: Oct. 15, 1996

[54] HYDRAULIC CIRCUIT FOR AUTOMATIC CONTROL OF A HORIZONTAL BORING MACHINE

[75] Inventors: Donald J. Keating, Perry; George E. Strecker, Edmond; Michael T. Teiga; Joe G. Worlow, both of Stillwater, all of Okla.

[73] Assignee: The Charles Machine Works, Inc., Perry, Okla.

[21] Appl. No.: 369,932

[22] Filed: Jan. 6, 1995

[51] Int. Cl.⁶ .................................................. E21C 5/16
[52] U.S. Cl. ........................... 137/2; 60/426; 137/118; 137/118.06; 173/1; 173/8; 173/9
[58] Field of Search .......................... 60/426; 137/2, 137/118; 173/1, 8, 9, 11; 408/8, 9, 10

[56] References Cited

U.S. PATENT DOCUMENTS

| | | | |
|---|---|---|---|
| 2,804,751 | 9/1957 | Schroeder | 173/8 |
| 2,905,441 | 9/1959 | Poundstone | 173/8 |
| 3,385,376 | 5/1968 | Hobhouse | 173/8 |
| 3,802,514 | 4/1974 | Ein | 173/8 |
| 4,271,914 | 6/1981 | Dressel . | |
| 4,356,871 | 11/1982 | Fujikawa | 173/8 |
| 4,711,090 | 12/1987 | Hartiala et al. . | |
| 5,358,058 | 10/1994 | Edlund et al. . | |
| 5,388,649 | 2/1995 | Ilomaki . | |

*Primary Examiner*—Stephen M. Hepperle
*Attorney, Agent, or Firm*—Richards, Medlock & Andrews

[57] ABSTRACT

A hydraulic circuit (10) is disclosed for use in controlling a horizontal boring machine which requires hydraulic fluid under pressure for rotating a drill bit or backreamer through a rotation circuit and hydraulic fluid under pressure for thrusting the drill bit or backreamer within the bore hole through a thrust circuit. Pressures from both the thrust circuit and control circuit are combined through restrictors in a mixing zone or area (26). The control port of a diversion valve (32) is connected to mixing zone (26). When the combined pressure in the mixing zone exceeds the adjustable spring bias on the diversion valve, the diversion valve will open, diverting fluid from the thrust circuit to a low pressure zone. This will cause a reduction in the pressure in the rotation circuit as well. The reduction of both pressures will reduce the combined pressure in the mixing zone (26), causing the diversion valve to close and the pressures to increase. The hydraulic circuit maintains a constant maximum output for both circuits for a given horsepower input to the boring machine and productivity is enhanced due to reduced operator fatigue.

13 Claims, 1 Drawing Sheet

5,564,455

HYDRAULIC CIRCUIT FOR AUTOMATIC CONTROL OF A HORIZONTAL BORING MACHINE

TECHNICAL FIELD OF THE INVENTION

This invention relates to a hydraulic control circuit for a boring device, such as a horizontal boring device for installing utility services and the like.

BACKGROUND OF THE INVENTION

Horizontal boring machines are used more and more frequently to install or replace utility services. The machines include a surface mounted boring unit which has a rotation motor to rotate a drill string having a drill bit at the end thereof and a thrust motor to thrust the drill string forward in the bore hole. The machine can also be used to backream a hole previously bored to enlarge the hole and pull in the new service.

Many horizontal boring machines require the operator to manually and individually adjust the rotation torque and thrust force which together define the amount of power applied to the downhole boring tool. Maintaining the correct balance of power between these two functions is necessary to maximize the efficiency of the unit. Inexperienced operators find it difficult to keep an efficient balance of thrust and rotation. Although necessary for both the boring of the pilot bore and backreaming to enlarge the size of the bore hole, the need for finite control is usually greater when backreaming. Therefore, a need exists for an apparatus to provide for operation of the machine at optimum efficiency even when used by inexperienced operators.

SUMMARY OF THE INVENTION

In accordance with one aspect of the present invention, a hydraulic control circuit is provided for use in a horizontal boring machine which rotates a drilling element with hydraulic fluid at a rotation pressure from a first source of hydraulic pressure and thrusts the drilling element in a given direction with fluid at a thrust pressure from a second source of hydraulic pressure. The control circuit includes a mixing zone and a diversion valve connected between the second source of hydraulic pressure and a zone of low pressure. A first passage connects the first source of hydraulic pressure and the mixing zone. The first passage has a flow restrictor so that if the pressure from the first source of hydraulic pressure is high for a sufficient amount of time for the pressure in the mixing zone to be increased to a high level, the diversion valve opens to direct a portion of the flow of fluid from the second source of hydraulic pressure to the zone of low pressure to reduce the pressure from the second source of hydraulic pressure.

In accordance with another aspect of the present invention, a second passage having a flow restrictor is connected between the second source of hydraulic pressure and the mixing zone. The first passage has a flow restrictor slightly larger than the restrictor in the second passage so if the pressure from the first source of hydraulic pressure is low, the pressure in the mixing zone will also be lowered. Conversely, if pressure in the first passage is high, the pressure in the mixing zone will also be higher. Pressure in the mixing zone is highest when both the first and second sources of hydraulic pressure are high. When pressure in the mixing zone is high, the diversion valve opens to direct the flow of fluid from the second source of hydraulic pressure to the zone of low pressure to reduce the pressure from the second source of hydraulic pressure.

BRIEF DESCRIPTION OF THE DRAWINGS

For a more complete understanding of the present invention and for further advantages thereof, reference is now made to the following description of the preferred embodiment, taken in conjunction with the accompanying drawing, in which.

DETAILED DESCRIPTION

Figure 1:
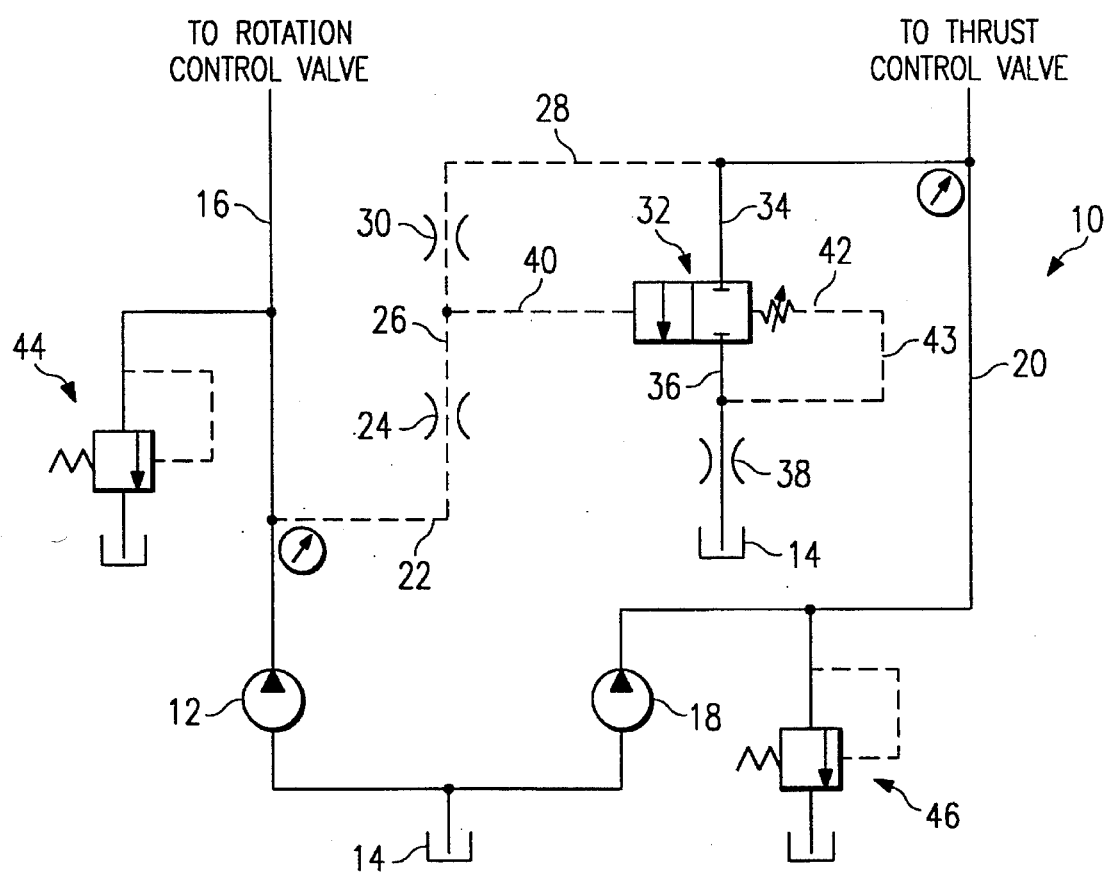
FIG. 1 is a circuit diagram of a first embodiment of the present invention.

With reference now to FIG. 1, a first embodiment of the present invention forming a hydraulic circuit 10 will be described.

The hydraulic circuit 10 is used in a horizontal boring machine which has a hydraulically operated rotating motor to rotate a drill string and a hydraulically operated thrust motor or piston to thrust the drill string either forward in the bore hole, as when boring a pilot bore or rearward in the bore hole, as when pulling back a backreamer or pulling in new service. The thrust motors can be rotary actuators or linear actuators. In the rotary actuator, a gear is typically rotated to drive a chain along a linear thrust path. Separate hydraulic pumps supply power to the rotation and thrust motors. As illustrated in FIG. 1, a rotation hydraulic pump 12 draws hydraulic fluid from a supply 14 and discharges the hydraulic fluid at a pressure into line 16 leading to a rotation control valve which permits selection of the direction of rotation of the rotating motor and the quantity of hydraulic fluid supplied. Similarly, a thrust hydraulic pump 18 draws hydraulic fluid from supply 14 and supplies pressurized fluid to a line 20 which extends to a thrust control valve. The thrust control valve permits selection of the direction of thrust motion, either forward during boring or rearward to backream the bore and the quantity of hydraulic fluid supplied.

Both pumps 12 and 18 are operated by a common engine so both pumps turn at the engine speed, which is essentially constant. With pump speed constant, the power required is directly proportional to the pressure of the hydraulic fluid discharged from the pumps. The pressure, in turn, is determined by, in the case of rotation of the drill string, the rotational torque required at a given instant to rotate the drill bit and, in the case of the thrust force, the hydraulic pressure which is required to move the drill string within the bore hole. If the rotational torque or the thrust forces at the tool face increase, the hydraulic pressure in the respective hydraulic lines also increases. The pressure delivered to the rotation motor and thrust motor can be regulated by the rotation control valve and thrust control valve. Generally, the rotation and thrust pressures will increase together or decrease together. If the thrust pressure increases, the drill bit or backreamer will be forcibly urged against the drill face increasing the torque necessary to rotate the drill bit or backreamer, increasing the hydraulic pressure in the rotation circuit. If the thrust pressure is decreased, the drill bit or backreamer will be urged against the boring face with less force, reducing the torque requirements and decreasing the hydraulic pressure in the rotation circuit.

A pilot line 22 extends from the line 16 through a flow restrictor 24 to a combined pressure mixing area or zone 26. A pilot line 28 extends from the line 20 through a flow restrictor 30 to the mixing zone 26 as well. A diversion valve 32 has an inlet line 34 connected to the line 20 and an outlet line 36 connected through a restrictor 38 to the supply 14. The diversion valve 32 has a spring biased spool which, in a first, closed position, as shown in FIG. 1, blocks the inlet line from the outlet line and, in a second, open position, connects the inlet line and outlet line. A control pilot port 40 extends from the mixing area 26 to the spool so that, when sufficient pressure is present in the mixing zone 26 and pilot port 40 to overcome the strength of the spring bias, the spool will move from the first position to the second position. Similarly, when the hydraulic pressure in the mixing zone 26 and pilot port 40 is reduced so that the force of the spring on the spool is greater, the spool will move from the second to the first position. Preferably, the spring bias has an adjustment 42 which allows the force of the spring to be adjusted.

A conventional pressure relief valve 44 is present in the line 16 to limit the hydraulic pressure in the line 16. Similarly, a pressure relief valve 46 is in the line 20 to limit the maximum hydraulic fluid pressure in the line 20.

Flow from the hydraulic thrust pump 18 is directed to both the manual thrust control valve (not shown) and the inlet port 40 of the diversion valve 32. The diversion valve 32 is normally closed, forcing all flow to the manual thrust control valve. When the pressure at the control pilot port 40 of the diversion valve 32 exceeds the spring setting on the diversion valve, the diversion valve moves to the second position, allowing a portion of the hydraulic fluid flow in line 20 to return to the supply tank, reducing the pressure in the thrust circuit. As the pressure of the thrust hydraulic fluid in line 20 is reduced by the opening of the diversion valve 32, the thrust force on the cutting tool or backreamer is reduced. However, as noted above, reducing the thrust force on the cutting tool also reduces the torque requirement. Therefore, the hydraulic pressure for rotation in line 16 is also reduced. The reduction of pressure in both lines 16 and 20 is communicated to the mixing area 26 through the restrictors 24 and 30 and begins to reduce the hydraulic pressure in the pilot port 40, permitting the diversion valve to begin moving to the closed position, causing the hydraulic pressure in the thrust circuit to increase, with a resultant increase in the thrust force applied. As noted, an increase in the thrust force of the cutting tool on the cutting face or backreamer similarly causes an increase in the rotation torque required and an increase in the hydraulic pressure in the rotation circuit. An optimum balance can be obtained between thrust and rotation by manually adjusting the adjustment 42 on the diversion valve 32. This setting can be preset based on the horsepower output of the engine driving the pumps 12 and 18, the desired efficiency or can be controlled by the operator.

The flow restrictor 38 is used to stabilize the system. Without this restrictor, thrust pressure in line 20 may be allowed to drop too rapidly. This, in turn, would cause the rotation hydraulic pressure to drop too far. As a result, the diversion valve 32 could close too rapidly, causing the hydraulic pressure in the thrust circuit to recover too rapidly. This sequence of events would result in a surging or hunting movement of the drill carriage. The flow restrictor 24 is preferably slightly larger, and therefore less restrictive, than the flow restrictor 30 so that if the pressure from the rotation line 16 is low the pressure in the mixing zone 26 will also be lowered. Conversely, if pressure in the rotation line 16 is high, the pressure in the mixing zone 26 will also be higher. Pressure in the mixing zone 26 is highest when both the rotation pressure in rotation line 16 and thrust pressure in thrust pressure line 20 are higher. When pressure in the mixing zone is sufficiently high, the diversion valve 32 will open to direct a portion of the flow from the thrust line 20 to the lower pressure zone of supply 14 to reduce the pressure in the thrust line.

Another unique feature of this circuit is that either function is allowed to operate at its full relief pressure setting even though the other circuit has low hydraulic pressure. The combined pressure at the mixing area 26 is a weighted average of the two circuits. Rotation pressure is controlled by its relief valve. Rotation pressure is not controlled except by thrust pressure. When one circuit has high hydraulic pressure, but the other circuit has low hydraulic pressure, the combined pressure stays below the limiting point on the diversion valve. For example, if the hydraulic pressure in the rotation circuit of line 16 was low, at 500 psi, and is insufficient to open the diversion valve 32, and the hydraulic pressure in the thrust circuit of line 20 is high, 2500 psi, the combined pressure in the mixing area 26 would be somewhere in between, for example, 1000 psi. It could take, for example, 2000 psi in the mixing zone to open the diversion valve. The 1000 psi pressure will be insufficient to open the diversion valve 32. In such an instance, a small amount of hydraulic fluid will actually flow from the thrust pressure circuit to the mixing area and rotation circuit, but the flow will be minimized by use of the flow restrictors 24 and 30. Also, a small amount of fluid is always flowing through the diversion valve inlet port 40. Therefore, enough fluid will flow through the mixing area to keep the combined pressure at the mixing area 26 below 2000 psi.

In normal boring and backreamer operation, the operator will manually set the thrust and rotation control valves at their full open position. It will also be understood that the valves will be manipulated as needed to make or break pipe as well. In normal boring and backreaming operations, the circuit 10 will automatically control the pressure to these control valves and thus the power delivered to the downhole tool. When digging conditions warrant, the rotation speed may be reduced manually with the rotation control valve. The circuit will still produce optimum performance from the horsepower available. Similarly, the thrust control valve may be reduced manually and, again, the circuit will still produce optimum performance for the horsepower available.

The diversion valve 32 illustrated in FIG. 1 is an internally vented valve. In other words, the drain line 43 from the diversion valve intersects the outlet 36 upstream of the flow restrictor 38. The diversion valve 32 could as easily be an externally vented valve where vent line 43 would empty directly into the low pressure supply 14. While either style diversion valve could be used, the spring force provided by adjustment 42 would likely need to be different.

The device can be seen to have four modes of operation. In the first mode, if the rotation pressure and the thrust pressure are low, the pressure in the mixing zone will also be low. In this first mode, the diversion valve will be closed. In the second mode, the rotation pressure would be high and the thrust pressure would be low. The mixing zone pressure would be moderately high, sufficient to open the diversion valve to limit the thrust pressure. In mode 2, the device provides automatic control of the thrust speed of the unit to optimize performance. Full rotational torque is available for boring, backreaming and making or breaking drill string joints. Mode 3 would be where the rotation pressure is low and the thrust pressure is high. This would provide a medium pressure in the mixing zone which is insufficient to open the diversion valve and the diversion valve would remain closed. This would permit the operator to use full thrust pressure or force when the rotation pressure is low and when trying to redirect the bore without rotation with a steerable bit. The fourth mode would be where the rotation pressure is high and the thrust pressure is high. This would result in the mixing zone pressure also being high and the diversion valve opening to limit the thrust pressure. In this fourth mode, the horsepower would be limited and the device would automatically control the thrust speed of the unit to optimize performance. Full rotation torque is also available for boring, backreaming and making or breaking drill string joints.

Although the circuit 10 is illustrated for use with two separate, fixed displacement pumps, the principle of the present invention can also be applied to a single pump circuit with either a fixed or variable flow divider to optimize the balance between the thrust and rotation circuits. The concept can also be applied to the control of a circuit utilizing multiple fixed or variable displacement pumps.

In one circuit constructed in accordance with the teachings of the present invention, the flow restrictor 24 was formed by a hydraulic line having a flow passage with the diameter of 0.8 mm (0.031 inches) while the flow restrictor 30 was formed by a hydraulic line having a flow passage with a diameter of 0.5 mm (0.020 inches). The restrictor 38 is formed by a hydraulic line having a passage with a diameter of 2 mm (0.078 inches). The pump 12 is a 20 GPM pump while the pump 18 is a 5 GPM pump.

In the circuit of the present invention, as a predetermined power level is reached, the hydraulic circuit will automatically control the output of the rotation and thrust hydraulic circuits, thus allowing higher continuous rotation speed and rotation pressure than is possible with manual control. This concept provides greater boring production from a smaller engine than can be achieved manually. Also, more production is possible because of reduced operator fatigue.

The hydraulic circuit automatically balances the power directed to the thrust and rotation functions applied to the downhole tools. The balancing of this power helps to optimize the horsepower consumed by the machine. The power required by the rotation function is proportional to the thrust force applied to the cutting tool whether it be a drill bit or backreamer. Fortunately, both rotation torque and thrust forces increase and decrease together. Therefore, reducing or increasing the thrust force will automatically reduce or increase the power required to rotate the tool against the face of the formation to be drilled.

In summary, at a set hydraulic pressure formed as a combination of the hydraulic pressure in the rotation and thrust circuits, some of the flow from the thrust pump will be diverted to the supply tank through the diversion valve. Diverting some of the thrust pump flow lowers the thrust pressure and the thrust force available at the tool. Lower thrust force automatically results in a lowering of the torque required at the drill face, lowering the pressure required from the rotation pump. Conversely, as the combined pressure declines below a set level, the diversion valve begins to close, directing more of the flow, and therefore higher pressure back to the thrust circuit. This, in turn, causes the rotation torque to increase again. Thus, the diversion valve is continuously adjusted by sensing the combined thrust and rotation pressures. Automatically adjusting the thrust or rotation pressure results in control of the total horsepower required.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A hydraulic control circuit for a horizontal boring machine rotating a drilling element with hydraulic fluid at a rotating pressure from a first source of hyraulic pressure and thrusting the drilling element by fluid at a thrust pressure from a second source of hydraulic pressure, comprising:

a mixing zone;

a diversion valve having an inlet port connected to the second source of hydraulic pressure and an outlet port connected to a zone of low pressure, the diversion valve having a control pilot port connected to the mixing zone;

a first passage having a flow restrictor connected between the first source of hydraulic pressure and the mixing zone; and a second passage having a flow restrictor connected between the second source of hydraulic pressure and the mixing zone.

2. A hydraulic control circuit for a horizontal boring machine rotating a drilling element with hydraulic fluid at a rotating pressure from a first source of hydraulic pressure and thrusting the drilling element by fluid at a thrust pressure from a second source of hydraulic pressure, comprising:

a diversion valve having an inlet port connected to the second source of hydraulic pressure and an outlet port connected to a zone of low pressure, the diversion valve having a control pilot port;

a first passage having a flow restrictor connected between the first source of hydraulic pressure and the control pilot port; and a flow restrictor between the outlet port of the diversion valve and the zone of low pressure.

3. The hydraulic control circuit of claim 1, wherein the flow restrictor in the second passage is an orifice of diameter 0.5 mm.

4. The hydraulic control circuit of claim 2, wherein the flow restrictor between the diversion valve and the zone of low pressure is an orifice of diameter 2 mm.

5. A hydraulic control circuit for a horizontal boring machine rotating a drilling element with a rotating motor controlled by a rotation control valve with hydraulic fluid at a rotating pressure from a first source of hydraulic pressure and thrusting the drilling element with a hydraulic actuator controlled by a thrust control valve by fluid at a thrust pressure from a second source of hydraulic pressure, comprising:

a rotation line connecting the first source of hydraulic pressure to the rotation control valve;

a thrust line connecting the second source of hydraulic pressure to the thrust control valve;

a diversion valve having an inlet port, an outlet port and a control pilot port, the diversion valve movable between a closed position and an open position, the inlet port and the outlet port being connected in the open position and the inlet port and outlet port being disconnected in the closed position;

a fluid line connecting the thrust line to the inlet port of the diversion valve;

a disclosure line connecting the outlet port of the diversion valve to an area of low pressure;

a mixing zone;

a rotation pilot line connecting the rotation line to the mixing zone;

a thrust pilot line connecting the thrust line to the mixing zone;

the mixing zone being connected to the control pilot port;

the rotation pilot line, thrust pilot line and discharge line each having a restrictor therein; and the circuit maintaining the rotating pressure and thrust pressure within a range determined by the restrictors in the rotation pilot line, thrust pilot line and discharge line and diversion valve setting.

6. The hydraulic control circuit of claim 5, wherein the restrictor in the rotation pilot line is a line having a passage of diameter of 0.8 mm, the restrictor in the thrust pilot line is a line having a diameter of 0.5 mm and the restrictor in the discharge line is a line having a diameter of 2 mm.

7. A method for automatically controlling the rotation forces and thrust forces in a horizontal boring machine rotating a drilling element with hydraulic fluid in a rotation line at a rotating pressure from a first source of hydraulic pressure and thrusting the drilling element with hydraulic fluid in a thrust line at a thrust pressure from a second source of hydraulic pressure, comprising the steps of:

connecting the rotation line to a mixing zone through a rotation pilot line having a restrictor;

connecting the thrust line to the mixing zone with a thrust pilot line having a restrictor;

supplying hydraulic fluid from the mixing zone to the control pilot port of a diversion valve, the inlet port of the diversion valve being connected to the thrust line and the outlet port of the diversion valve being connected to a zone of low hydraulic pressure; and adjusting the force necessary to move the diversion valve between the open and closed position to maximize efficiency of the horizontal boring machine.

8. The hydraulic control circuit of claim 1 further comprising a flow restrictor between the outlet port of the diversion valve and the zone of low pressure.

9. The hydraulic control circuit of claim 1 wherein the diversion valve has an adjustable diversion force.

10. The hydraulic control circuit of claim 1 wherein the flow restrictor in the first passage is an orifice of diameter 0.8 mm.

11. The hydraulic control circuit of claim 2 further comprising a second passage having a flow restrictor connected between the second source of hydraulic pressure and the control pilot port.

12. The hydraulic control circuit of claim 2 wherein the diversion valve has an adjustable diversion force.

13. The hydraulic control circuit of claim 2 wherein the flow restrictor in the first passage is an orifice of diameter 0.8 mm.

* * * * *